United States Patent [19]

Grinberg et al.

[11] Patent Number: 4,807,978

[45] Date of Patent: Feb. 28, 1989

[54] COLOR DISPLAY DEVICE AND METHOD USING HOLOGRAPHIC LENSES

[75] Inventors: Jan Grinberg, Los Angeles; Ronald T. Smith, Redondo Beach, both of Calif.

[73] Assignee: Hughes Aircraft Company, Los Angeles, Calif.

[21] Appl. No.: 96,093

[22] Filed: Sep. 10, 1987

[51] Int. Cl.$^4$ .......................... G02B 5/32; G02F 1/13; G03H 1/18; H04N 9/12

[52] U.S. Cl. .................... 350/3.73; 350/3.77; 350/167; 350/331 R; 340/701

[58] Field of Search .................... 350/3.72, 3.73, 3.77, 350/167, 320, 331 R; 340/701, 702

[56] References Cited

U.S. PATENT DOCUMENTS

| | | | |
|---|---|---|---|
| 3,807,829 | 4/1974 | Close | 350/3.72 |
| 3,824,002 | 7/1974 | Beard | 350/342 |
| 3,915,548 | 10/1975 | Opittek et al. | 350/3.72 |
| 3,940,204 | 2/1976 | Withrington | 350/3.72 |
| 4,367,366 | 1/1983 | Bloss et al. | 350/3.73 X |
| 4,372,639 | 2/1983 | Johnson | 350/3.7 |
| 4,536,833 | 8/1985 | Davis | 350/3.72 X |
| 4,686,519 | 8/1987 | Yoshida et al. | 340/701 |

OTHER PUBLICATIONS (517310064) Horner, J., et al., "Single Holographic Element Wavelength Demultiplexer," Applied Optics, vol 20, No. 10, 15 May 1981, pp. 45-1847.

Coller, R., et al., *Optical Holography,* New York, Academic Press, 1971 (QC 449.C6), pp. 514-522.

Takanori Okoshi, "Three Dimensional Imaging Techniques", Dept. of Electronic Engineering, University of Tokyo, Tokyo, Japan, Academic Press, N.Y., San Francisco, London 1976, pp. 21-22, 127-128.

Duane Haven, "Electron-Beam Addressed Liquid-Crystal Light Valve", 1982 International Display Research Conference, pp. 72-74.

*Primary Examiner*—John K. Corbin
*Assistant Examiner*—David J. Edmondson
*Attorney, Agent, or Firm*—V. D. Duraiswamy; A. W. Karambelas

[57] ABSTRACT

A system and method are described for achieving a high efficiency, full color display using color sensitive lenses such as holographic lenses. A lens assembly is composed of discrete lens elements (1, 2, 3) which are sensitive to different wavelengths bands of light. Each lens element (1, 2, 3) focuses input light within its waveband onto a corresponding target area, and generally transmits input light outside of its waveband. A separate target area (R, G, B) is provided for each lens element, whereby incoming light is divided into its constituent colors. The separate color stripes (R, G, B) may then be operated upon to produce a desired display. For incoming light which is to be divided into n different wavebands and directed onto separate target areas each having an area A, the area of each lens element is approximately nA, and each lens overlaps the next adjacent lens by an area approxmately equal to (n-1)A. By generally transmitting rather than absorbing light outside the band of each lens element, the assembly achieves a high degree of both efficiency and resolution. Specific applications to various types of flat-panel displays and light valves are disclosed, as well as preferred fabrication techniques for the holographic lenses.

30 Claims, 10 Drawing Sheets

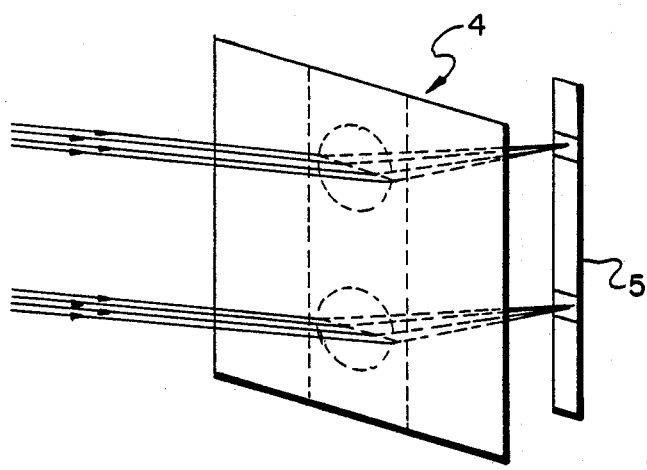
Fig. 3.a.
(CYLINDRICAL LENS)
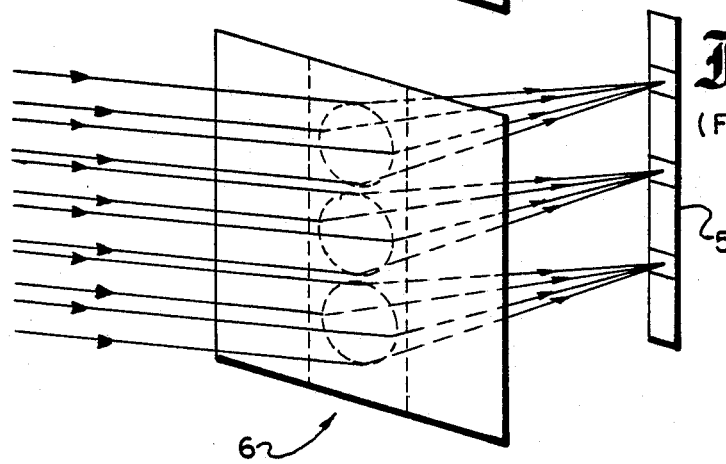
Fig. 3.b.
(FLY'S-EYE LENS)
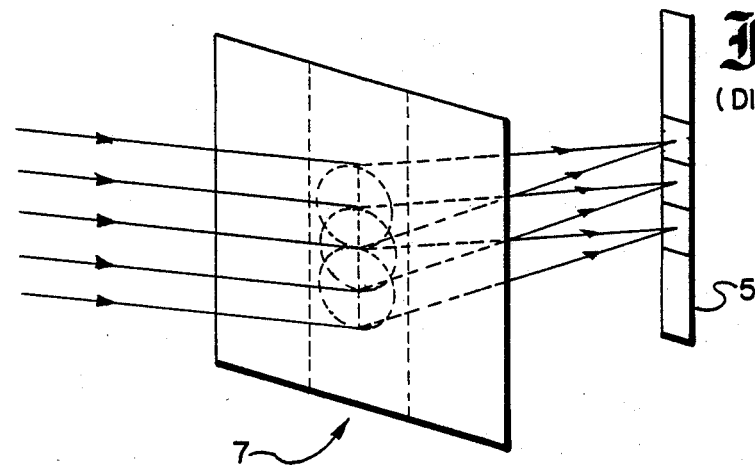
Fig. 3.c.
(DIFFUSION LENS)

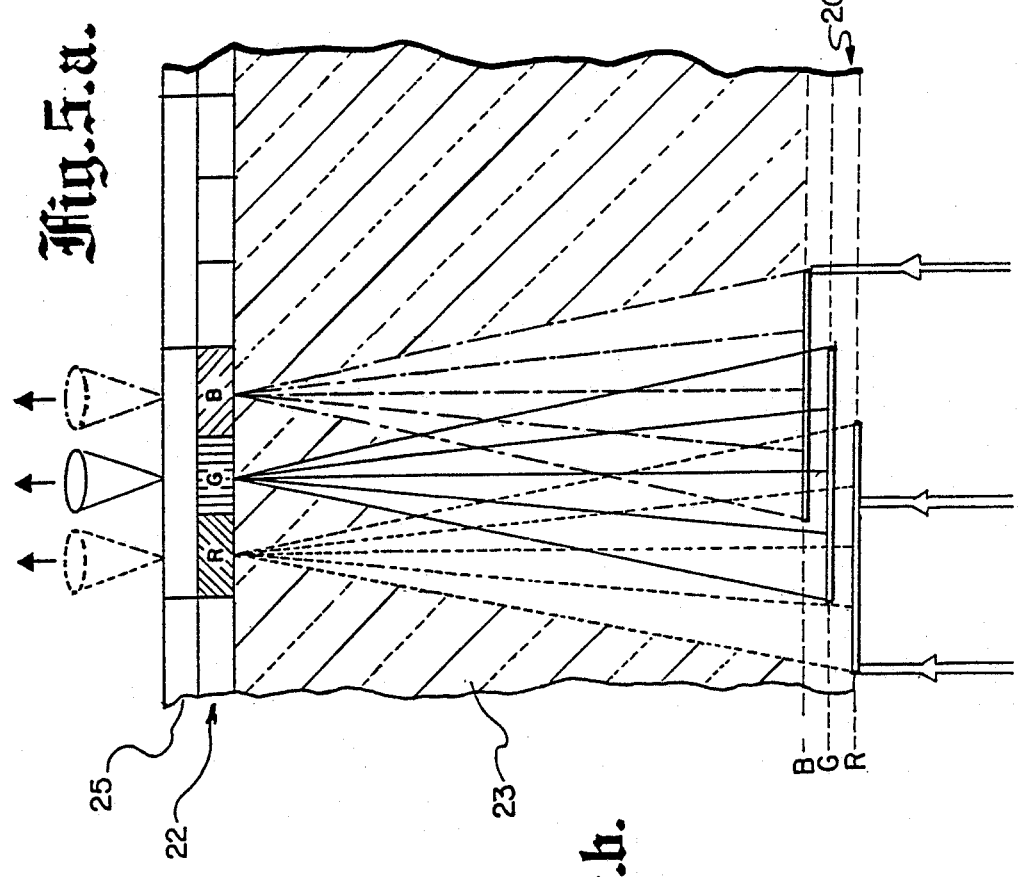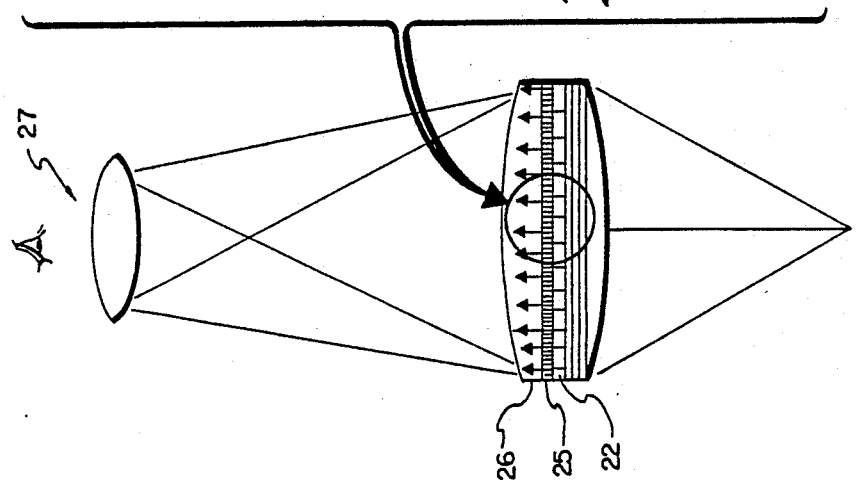

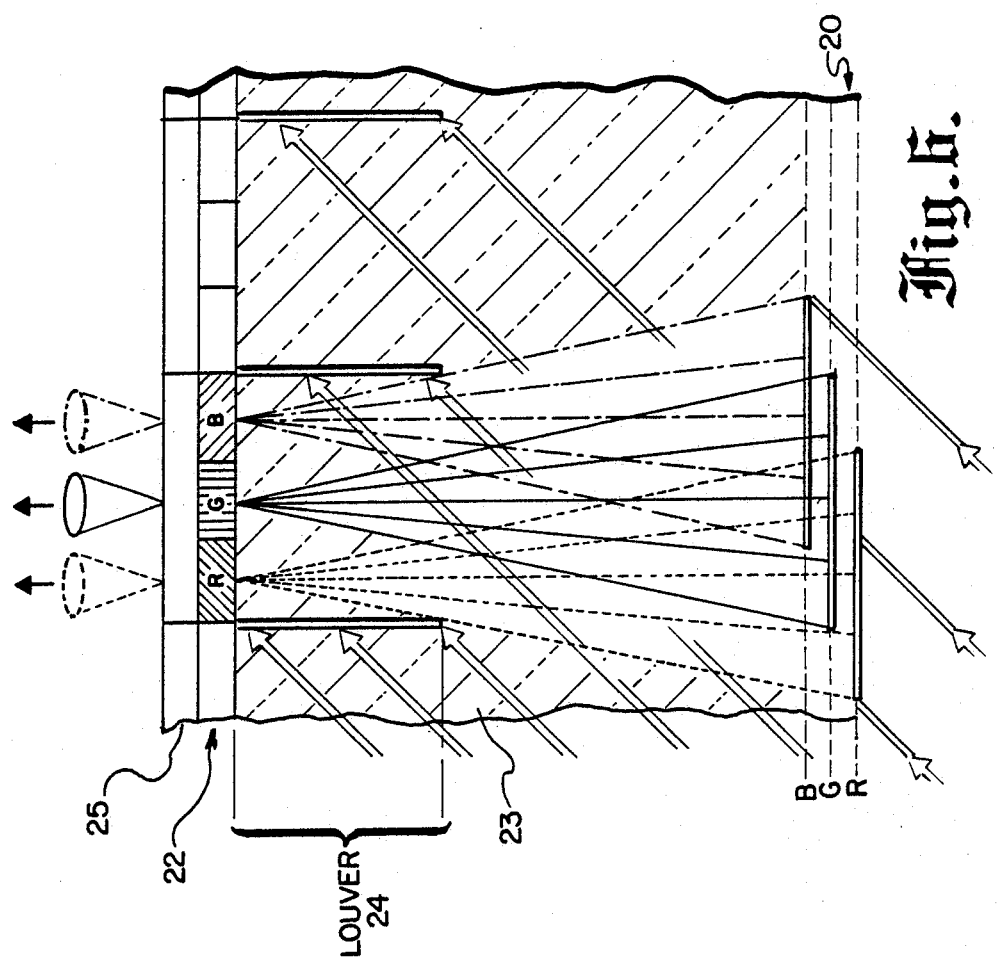

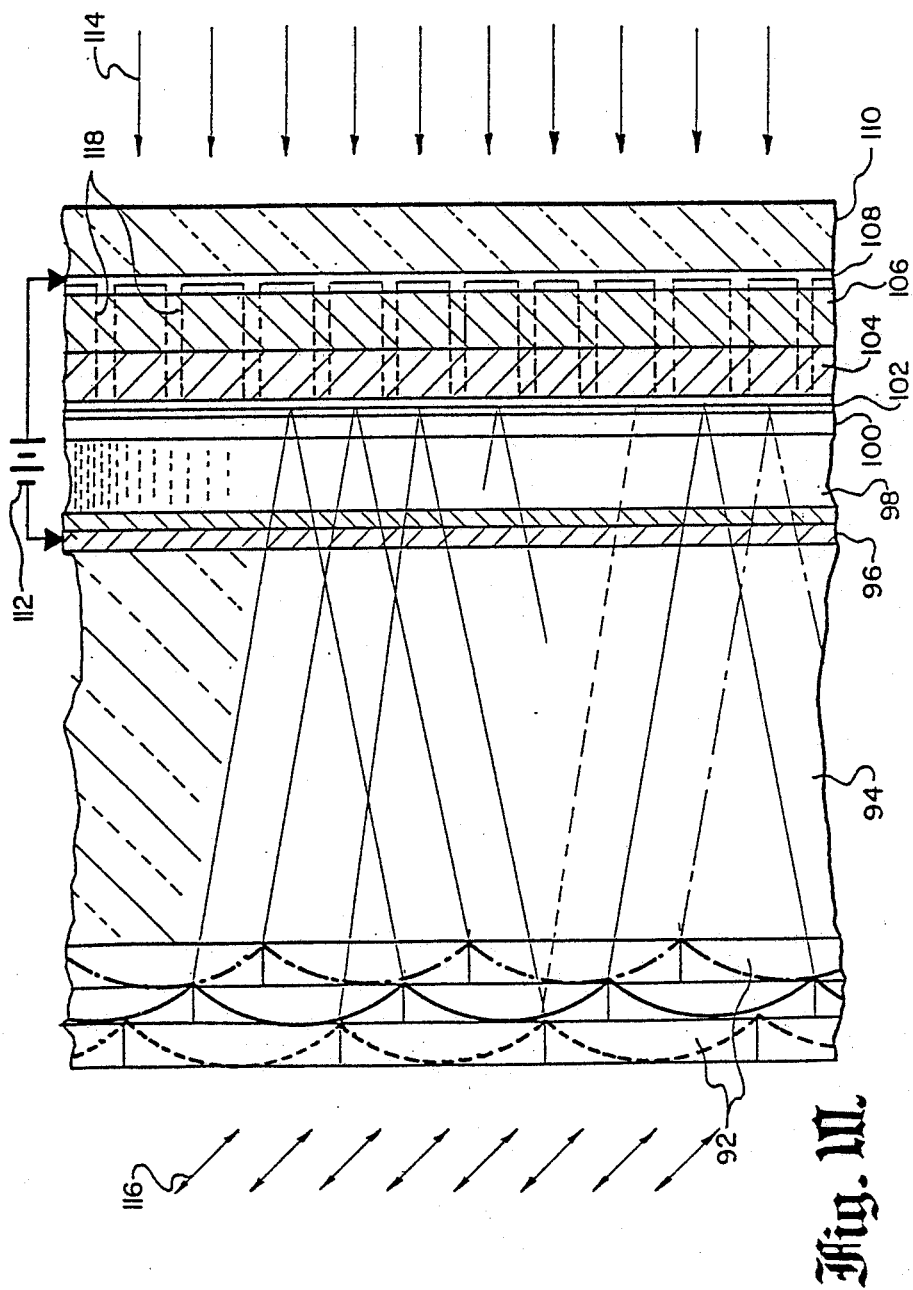

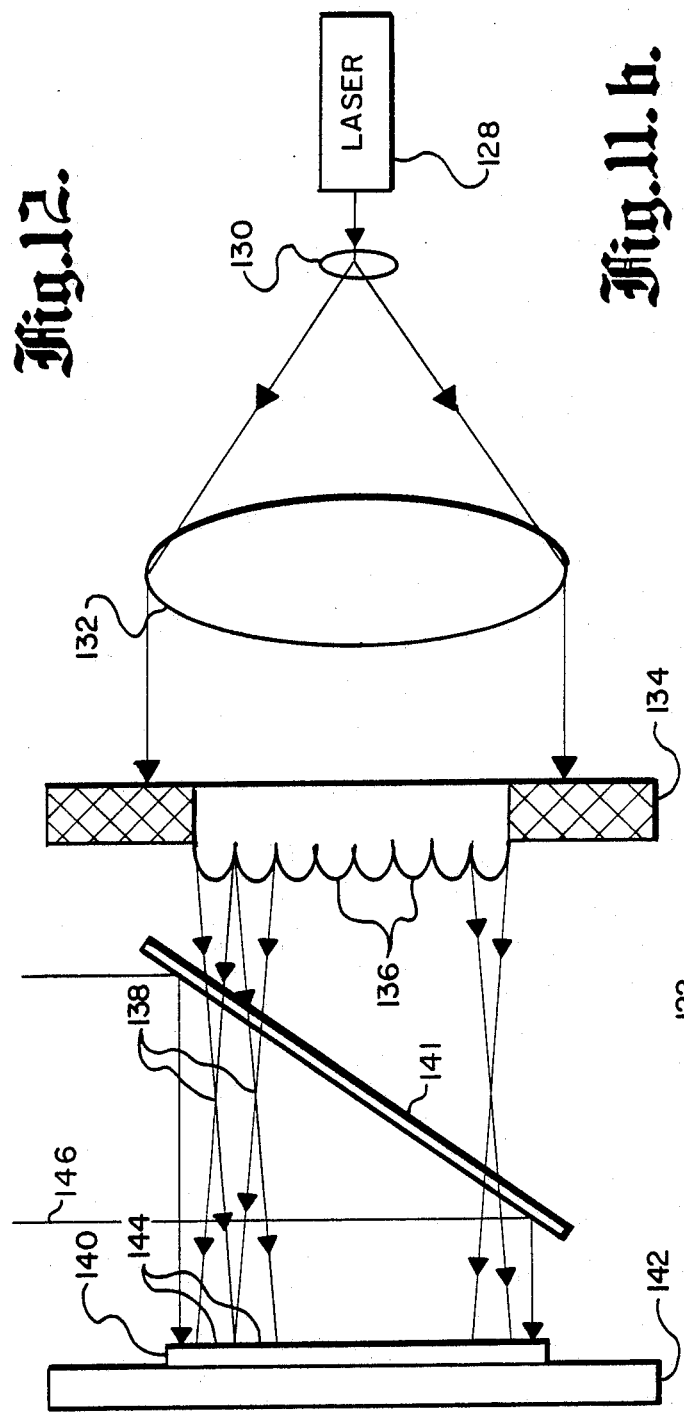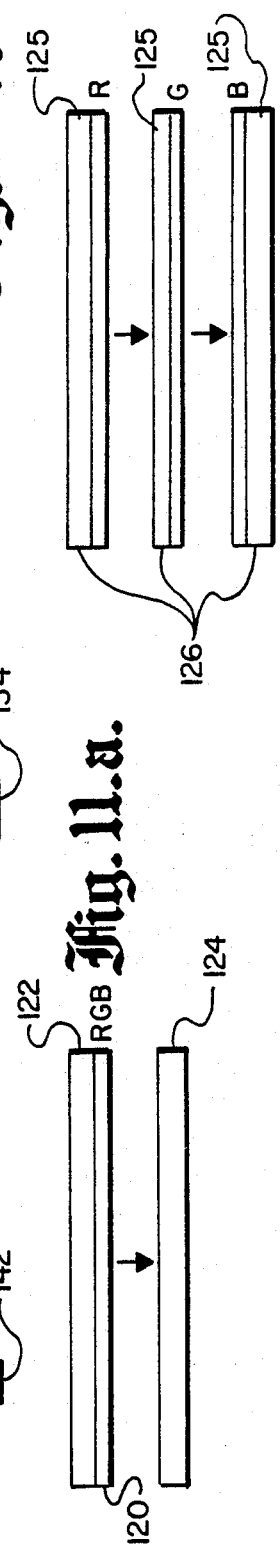

COLOR DISPLAY DEVICE AND METHOD USING HOLOGRAPHIC LENSES

BACKGROUND OF THE INVENTION

1. Field of the Invention

This invention relates to color display devices and methods, and more particularly to color display devices in which input white light is color code for transmittance through the display.

2. Description of the Related Art

A conventional method for achieving full color performance in a color display such as a backlit, transmissive flat-panel matrix display employs a repeated series of red, green and blue transmissive filter stripes to color code incident white light. The white light passes through the absorptive dye filter stripes, which transmit the filter color but absorb other colors. The matrix display likewise consists of a repeated series of red, green and blue information containing lines. The filter stripes are precisely registered with respect to the matrix display so that the red, green and blue light emerging from the filters pass through the red, green and blue information-containing stripes of the matrix display, respectively. A typical display may have 525 color lines, which are visually integrated by the viewer to produce a full color image.

One of the principal drawbacks of this approach is that each filter stripe absorbs light outside of its pass band. Thus, most of the light which is directed onto the display device will generally be absorbed and never displayed, resulting in a reduced output intensity and/or the need for light enhancement apparatus. Furthermore, the observer's eye has to integrate the intensities of the three color display stripes to perceive the desired color hue. This limits the resolution of the display. The complicated lithographic process associated with deposition of the color stripes adds additional complexity to the process.

It is also possible to provide a full color display from a monochromatic CRT by means of one or more color light valves which respond to the CRT output. In one approach three CRTs are employed with three separate light valves and associated optics to produce an integrated full color display. The system requires a large amount of equipment and coordination, and is expensive and complicated. Another approach uses three one-inch CRTS to address a two-inch light valve with optics that combine the three primary color images on the screen. Still another approach involves a sequential addressing of a CRT/light valve combination by the red, green and blue fields, and synchronous rotation of a color wheel in front of a light valve. To accomplish this, a very fast CRT/light valve combination is needed in addition to a three field memory. More than two-thirds of the light is lost in the system and fails to appear on the output display.

SUMMARY OF THE INVENTION

In view of the above problems associated with the approaches discussed above, a feature of the present invention is the provision of a novel and improved color display system and method which preserves most of its input light, and achieves a much higher readout light efficiency than prior devices.

Another advantage is the provision of such a system and method in which the different color stripes are inherently superimposed on each other by the display device itself, eliminating the need for the viewer to visually integrate the intensities of separate color stripes. This significantly improving the display's resolution.

In addition, the invention avoids the need for a complicated lithographic process formerly used to deposit color stripes, and is less complicated and expensive than some of the prior art approaches.

These and other objects of the invention are achieved by providing a color display device which has a target array comprising a plurality of generally adjacent target areas which correspond to predetermined waveband components, preferably red, green and blue bands, of an input light beam. An area lens assembly is spaced from the target array and adapted to receive an input light beam. The lens assembly has, for each target area in the target array, a lens which is optically aligned with the target area. Each lens at least partially focuses light within the waveband of its corresponding target area onto that area, and generally transmits light outside of its waveband. The various lenses are arranged in the lens assembly so that at least one lens for each of the waveband components is located in the input light beam path at substantially all locations in the beam.

In a preferred embodiment holographic lenses tuned respectively to red, green and blue wavebands are used in the lens assembly. Lenses of the same color are laterally positioned with respect to each other, while the different color lenses overlap and are laterally offset from each other by about one-third the lens width. Light within any of the color bands will encounter a lens for each different color band, and will be generally transmitted by the other two color lenses but focused onto a particular target area by its own color lens. The incoming light is thus broken down into its component wavebands, with substantially all of the light directed onto one or another of the target areas. In principle, 100% light efficiency can be achieved.

The system can be generalized for input radiation which is comprised of n different radiation wavebands and target areas of approximately A, such that the area of each lens is approximately nA and the area of overlap between each lens and the next adjacent lens is approximately $(n-1)A$. The lens for each waveband preferably has a peak response to radiation near the center of the waveband and a generally progressively diminishing response to radiation further away from the center of the waveband, whereby input radiation is distributed over its corresponding target area in accordance with its wavelength position within the waveband.

Processing of the holographic lenses is less complicated than the lithographic process formerly used to deposit color stripes. Various constructions are possible, including the formation of red, green and blue lenses on a single substrate, the formation of the three color lenses on individual substrates which are then laminated together, or the formation of the red lens on one substrate and the blue and green lenses on a second substrate which is then laminated with the first substrate.

The invention is adaptable to various different applications. One application is a light valve, preferably employing liquid crystals as a light modulating medium. The holographic lenses are disposed on the opposite side of the liquid crystal medium from pixels which form the target areas. In a reflective mode the pixels are actually imposed upon a mirror which reflects incoming light back through the liquid crystal medium. The pixels are electrically addressed either by a CRT electron beam, or by a control light beam acting through a photoconductive medium. The liquid crystal light modulation is locally controlled by the signal applied to each pixel, such that the output display represents an accumulation of the individual pixel states. The incoming light converges onto the pixels from the lenses, but then diverges again after reflection so that the various colors are superimposed upon each other. This offers a significant improvement in picture quality, since it eliminates the prior need for the observer to visually integrate separate color stripes into an overall image.

Other applications include a backlit, single lens color display panel. In this application both the illumination efficiency and image clarity is significantly improved.

These and other objects and features of the invention will be apparent to those skilled in the art from the following detailed description of preferred embodiments, taken together with the accompanying drawings, in which:

DESCRIPTION OF THE DRAWINGS

FIGS. 3(a), 3(b) and 3(c) are illustrations of the focusing effects respectively of holographic cylindrical, Fly's-eye and diffusion lens arrays;

FIG. 5(a) is an enlarged illustrative view of a flat panel display incorporating the present invention;

FIG. 5(b) is an elevation view of a display system incorporating the flat panel display of FIG. 5(a);

FIG. 6 is an enlarged illustrative sectional view of an alternate embodiment of a flat panel display incorporating the present invention;

FIG. 10 is an enlarged illustrative sectional view of a liquid crystal light panel employing the present invention and controlled by a light beam;

FIGS. 11a and 11b are elevation views illustrating different techniques for assembling the holographic lenses used in the present invention;

FIG. 12 is a fragmentary plan view of a striped mask reticle pattern used in forming one of the holographic lenses;

DETAILED DESCRIPTION OF THE PREFERRED EMBODIMENTS

Figure 1:
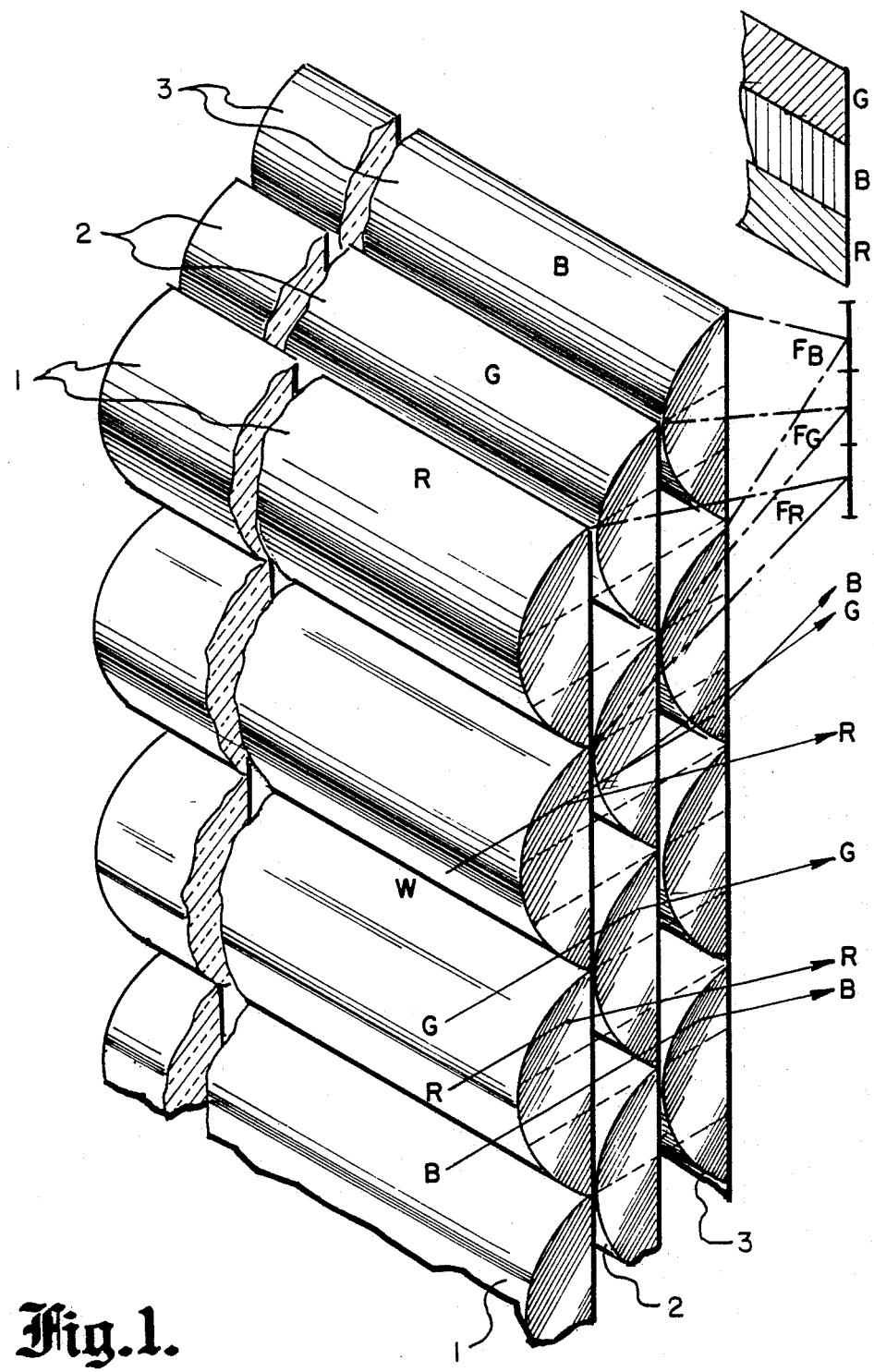
FIG. 1 is a perspective view of a theoretical lens system which is equivalent to the lens system of the present invention for purposes of describing the invention.

A lens system is illustrated in FIG. 1 which is functionally equivalent to the lens system of one embodiment of the present invention, and is useful in illustrating the principles of the invention. Separate series of red, green and blue lenses 1, 2 and 3, respectively, are arranged with each lens of a common color lying in a single plane, and the different color planes lying directly one behind the other. The lenses are shown as convex glass devices for purposes of illustration. In actual practice, holographic lenses are preferred which may be formed either in separate planes as illustrated, or in a generally common plane.

Each lens is responsive to only one color or, more precisely, to a band of radiation wavelengths centered upon only one color. The lenses are adapted to have a focusing effect upon light within their respective wavebands, the fraction of light being focused depending upon how far the particular wavelength of interest is from the center of the color band; the fraction of light being focused generally decreases with increasing distance from the center wavelength. Each of the lenses generally transmits light outside of its waveband without a substantial percentage being focused.

The lenses for the various colors are arranged in a staggered order, such that the lenses for any one color are offset from the lenses of the other colors by equal amounts. Thus, a ray entering the lens matrix from the rear will pass through a lens for each of the different colors. The staggered lens arrangement results in focal points for the different color lenses at regularly spaced intervals along a focal line which is essentially parallel to the lens plane; the focal points for one set of red, green and blue lenses is illustrated by points $F_R$, $F_G$ and $F_B$ in FIG. 1.

With lenses for three different primary colors, each lens is offset from the lenses for the other colors by approximately one-third of its area to produce the desired color separation. This is illustrated in FIG. 1 by the dashed line extensions from the ends of each lens, which can be seen to extend through corresponding lenses for the other colors at about one-third the lens widths from their extremities. The lenses are designed so that light at the center wavelengths of their respective wavebands are focused directly onto the focal point of the lens, while light that is still within the waveband but is further removed from the center wavelength is only partially focused. Light at the end of each waveband is focused to a point midway to the center focal point of the next adjacent lens. Thus, with lenses for three different colors, the distance between the focal points for the different color lenses will be one-third the widths of the lenses themselves. Since the planar face of each lens occupies an area, light with its waveband will be focused to an area stripe; three such color stripes are indicated in the inset at the upper right of FIG. 1. Accordingly, the focal plane area A occupied by light within the full waveband for each lens will be one-third the area of the lens itself. This concept can be extended to a generalized case in which the input radiation is to be divided into n waveband components, with the target area for each lens equal to A. In this case the area of each lens will be approximately nA, and each lens will overlap the next adjacent lens by (n-1)A.

The action of the lens assembly upon incoming light rays is illustrated in the lower portion of FIG. 1. A ray of white light, labeled W, consists of red, green and blue waveband components. The ray initially reaches a red lens, which diffracts (for a holographic lens) the portion of the ray within the red waveband and transmits the remainder of the ray without substantial change. The ray then reaches a green lens, which diffracts the radiation within the green waveband and transmits the remaining blue band radiation. Finally, the remaining blue band radiation reaches a blue lens, where it is diffracted onto the focal area for that lens.

The transit of red, green and blue (R, G and B) light rays through the lens assembly is also illustrated. It can be seen that each ray is transmitted without substantial change through the color lenses, and diffracted only by its own color lens. Thus, substantially all of the incoming light is processed through the lens assembly and reaches the target area. This offers a great improvement in efficiency when compared to prior color displays, in which most of the light is excluded from the display area by absorption in the lens itself.

Referring back to the upper portion of FIG. 1, it can be seen that each lens focuses light within its waveband onto a discrete target area, illustrated as color stripes in the inset, thereby providing full color separation. The separate target areas can then be operated upon to eliminate, reduce or otherwise modify the light incident thereon before it is displayed. In this manner incident white light can be separated into its different color components, with each component either included or excluded from the ultimate display. Furthermore, it will be noted that each lens causes light within its waveband to converge onto its respective target area, which is smaller than the lens itself. After reaching the target area, selected portions of the converging light can then be reflected back through the lens assembly, or transmitted on past the target area. In either case the reflected or transmitted light will exhibit an angular divergence, rather than convergence, as it leaves the target area. This phenomenon can be advantageously employed to produce a display in which waveband-separated light from the discrete target areas have diverged and are effectively superimposed upon each other in the display. This significantly enhances the resolution of the display, as compared with prior art displays in which the eye has to integrate the intensities from separate color stripes to perceive the desired color hue. Examples of specific applications for these principles are provided below.

The design of the individual holographic lenses is important; they should be responsive to sufficiently wide wavebands of light so that all incoming light is subject to diffraction onto the proper target area, but the wavebands should not be so wide that adjacent lenses significantly interfere with each other. The first holographic lens, called the "red" lens, is designed to diffract red light most efficiently, and to direct the diffracted light onto the red stripe or target area of the matrix display. However, the red lens also diffracts at other wavelengths both above and below the red peak wavelength. An intrinsic property of holograms is that light of different wavelengths incident upon the hologram is diffracted at different exit angles; this property is known as chromatic dispersion. The amount of dispersion can be controlled by controlling the spacing of the lens surface fringes - the more closely spaced the fringes (and consequently the farther off-axis the angle of incident light with respect to the exit rays), the greater the dispersion effect. Therefore, the red holographic lens is preferably designed so that the light diffracted from it will be incident on the matrix display target area in a rainbow-like fan of rays, with the deep red, red, orange-red and orange light illuminating the "red" display stripe, the yellow, yellow-green, green and blue-green light illuminating the "green" matrix display stripe, and the blue, indigo and violet light illuminating the "blue" matrix display stripe. Since each stripe is angularly narrow with respect to the viewer, the eye blends the colors into one, and should perceive the stripes as truly being blue, green and red. However, if high purity colors are desired, a prefilter can be used to eliminate the orange and yellow wavelengths from the illuminating spectrum. In a similar manner, the green holographic lens is designed to diffract most efficiently in the green portion of the spectrum, and the "blue" lens is designed to diffract most efficiently in the blue portion of the spectrum, but both lenses are designed to diffract light of all wavelengths into their appropriate stripes on the matrix display.

Care must be exercised in designing the spectral bandwidths of each of the three holographic lenses. If the bandwidths are very wide, each lens will diffract both blue, green and red efficiently, which will result in color crosstalk problems. For example, red light diffracted by the red lens towards the intended stripe on the matrix display would be partially rediffracted by the green lens into an unwanted location. The effect of color crosstalk is to reduce the color purity of the light incident on the matrix display. On the other hand, designing the spectral bandwidths to be very narrow would result in an appreciable amount of incident light passing undiffracted through all three lenses onto unwanted locations on the matrix display, resulting once again in reduced color purity and contrast.

Figure 2:
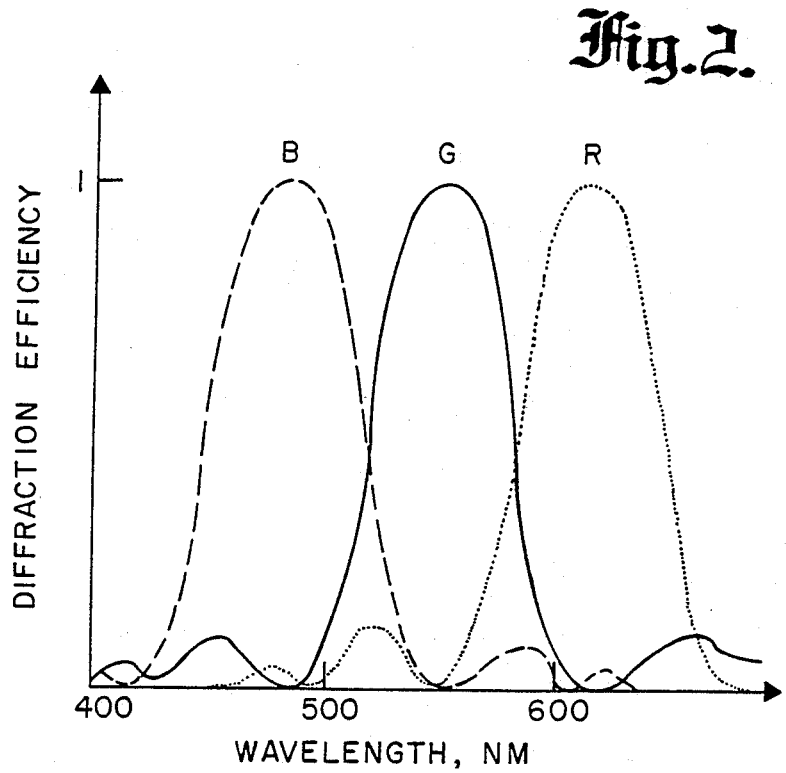
FIG. 2 is a graph illustrating the wavebands of the lenses employed in a preferred embodiment.

The spectral bandwidths of the three lenses are designed to lie between these two extremes, such as in the spectra shown in FIG. 2. For each lens the diffraction efficiency is greatest for wavelengths at the center of its waveband, and generally progressively decreases with increasing distance from the center. The "waveband" for each lens may be considered to be that portion of the spectrum in which its diffraction efficiency is greater than 50% of the peak efficiency (which can be as high as 100%). While the lenses only reach 100% diffraction efficiency at their center wavelengths, they may be described as being generally diffractive at wavelengths within their respective wavebands, and generally transmissive at other wavelengths. Since volume transmission holographic lenses are capable of diffraction efficiencies of virtually 100% at the peak wavelength, careful design of the hologram spectra can result in overall efficiencies of 80%-90%.

The description thus far has been limited to cylindrical holographic lenses which simulate the performance of the cylindrical lens array shown in FIG. 1, and which focus incident light only in one dimension. This is illustrated in FIG. 3(a), in which a cylindrical lenslet within a holographic cylindrical array 4 is shown focusing a pair of one-dimensional beams onto respective pixel cells of a "stripe" target 5. Everything said so far would apply equally well to a hologram that focuses light in two dimensions, such as the Fly's eye lens hologram in FIG. 3(b) on the diffusion hologram of FIG. 3(c). The Fly's eye lens array 6 is composed of columns of individual Fly's-eye lenses, each of which focuses light in two dimensions down to a point corresponding to a pixel cell. The diffusion lens array 7 consists of a series of columns of diffusion lenses, each of which may be thought of as a superposition of an infinite number of Fly's-eye lenses. Each of these three holograms focuses light in a certain bandwidth from a holographic lens "column" down to a narrow vertical "target", but each does so in a different way. A Fly's-eye lens is described in a text by Takanori Okoshi, "Three-Dimensional Imaging Techniques", Academic Press, 1976, pages 2.4/21–22 and 5.2/127–128 while a preferred fabrication techniques for a diffusion lens is described hereinafter.

Figure 4:
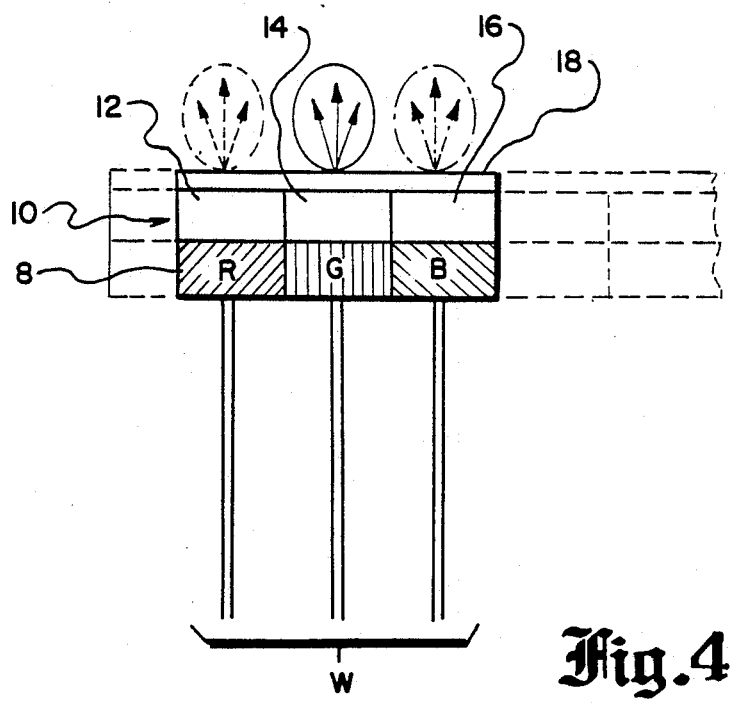
FIG. 4 is an enlarged illustrative sectional view of a prior art flat panel display.

One application of the invention is in a backlit, transmissive flat-panel matrix display. A conventional matrix display of this type which achieves full color performance is illustrated in FIG. 4. Collimated incident white light W becomes color-coded by passing through an absorptive dye filter 8 consisting of a repeated series of red, green and blue transmissive stripes. The striped filter is precisely registered with respect to a matrix display 10 so that the red light passes through the red information-containing stripes 12 of the matrix display, the green light passes through the green information-containing stripes 14, and the blue light passes through the blue information-containing stripes 16. A front screen 18 is provided over the opposite face of the matrix display to provide a viewing surface.

Because the filter 8 is a substractive filter, its overall transmittance is quite low - typically no greater than about 30%–40%. This is because the filter extracts red light from white light by absorbing the green and blue portions of the spectrum, and employs a similar substractive process to extract green and blue light. In a typical panel display the collimated white light transmitted through the matrix display is diffused by front screen 18. In this case, an additional concern is that ambient light incident on the front screen will be backscattered and result in reduced color contrast.

A novel flat-panel display which employs the principles of the present invention to resolve these problems is illustrated in FIG. 5(a). This system significantly improves the transmittance through the panel display to provide more efficient utilization of the input white light, while enabling an accurate registration of the colored light with the matrix display. In addition, it directs light onto the matrix display elements at an appropriate angle. For example, transmissive liquid crystal matrix displays which achieve light modulation either through polarizers or through the use of guest-host molecules have a limited cone of incident light for desired performance, centered about normal incidents. The present display apparatus can conform to this requirement.

In this application a lens assembly consisting of multiple series of repeated red, green and blue holographic lenses 20 as described above are provided. The lenses are aligned with an array of individual liquid crystals matrix cells 22. The cells are typically 1 to 20 mil square, and are typically spaced from the lenses by about 10–150 mils by a transparent glass spacer 23. The cells are arranged so that the red-containing information is located in a column or "stripe" of cells, the green-containing information is in an adjacent stripe, and the blue-containing information is in another adjacent stripe, with the pattern repeated over and over. When viewed from a distance of 30 inches, with no lenses on the viewer's side, the red, green and blue stripes will be blended by the eye into one.

White light W from a projector is collimated by a field lens (not shown) and is directed at normal incidence onto the lenses 20, which are preferably 3–60 mil wide transmission holograms. The three hologram planes are shifted 10 mils with respect to each other, to yield identical diffracted beam geometries. Other registrations between the holograms are possible, but the 1–20 mil shifted registration is preferred with a value of about 1 mil typically being suitable for projection display and about 10 mil typically being suitable for flat panel display.

In addition, the high diffraction efficiencies exhibited in these holograms, as illustrated in FIG. 2, are only possible for dichromated gelatin film when the angle between the incident and diffracted rays is fairly large (no smaller than 10 degrees). For portions of the holograms which diffract less than 10 degrees with respect to the incident angle, the diffraction efficiency is significantly reduced, and a substantial portion of the incident light passes through. Each hologram lenslet has a central region in which the diffraction angle is very small, and therefore a substantial portion of incident light passes through the hologram. However, as long as the low diffraction region is no wider than the width of the target, the holographic filter should effectively separate white light into red, green and blue. For example, assume white light is incident upon the red hologram, as in FIG. 5a. Assuming that the low efficiency region of each hologram is ⅓ the hologram lens width, or equal to the target width, the red portion of the white light incident upon the outer ⅔ of the red hologram will be efficiently diffracted to the red target, while the blue and green light will pass through. In the central ⅓ of the red hologram, white light will pass through substantially unimpeded. However, the blue and green portion of the white light will be diffracted to the proper targets by the subsequent blue and green holograms respectively. The red portion of the white light transmitted through the red hologram will pass through the blue and green holograms to the red target. Similarly, a substantial portion of the blue and green light will also reach the proper targets as long as the low-efficiency central region is narrow enough. Assuming that the low efficiency region is for bend angles of 5 degrees or less, the f stop of the holograms must be less than 1.87, where f stop is the ratio of the lens-to-display distance to the lens diameter.

On the other hand, for other reasons it is advantageous to make the f stop relatively large. One reason is that the hologram lens diffraction properties vary as a function of exit angle of the diffracted ray. In a low f stop system in which the lens is designed to be close to the matrix display, the exit angle of diffracted rays vary significantly from one side of the lens to the other, and so also do the performance properties of the lens. It therefore may be difficult to design all points on the lens to perform optimally; the result is reduced efficiency and color contrast. Another reason is that the rays focusing down from the holographic lens to the narrow matrix display stripe fan out on the other side of the matrix cell in a diverging beam. For applications in which the exit pupil is small and highly localized, such as in an airplane cockpit, the fan of rays exiting from each matrix display cell in a low f stop system may be unnecessarily wide, resulting in a degraded display brightness. Furthermore, most transmissive liquid crystal matrix displays lose image contrast when the image beam deviates appreciably from normal. Therefore, the beam incident upon the matrix display should not have too low an f stop. On the other hand, if the lenses are too far removed from the matrix display surface, then precise registration of the rays diffracted by the lens to the matrix display may become difficult.

With proper adjustment of the f stop, one can separate red, green and blue to an acceptable degree of color purity for many display applications. However, since the color filter is not perfectly efficient, there will be some reduction in color purity of the display caused by light undiffracted by the filter which illuminates the "wrong" target stripes. In cases where a high degree of color purity is required, there is an alternate embodiment of this invention, shown in FIG. 6, which will satisfy this requirement. This alternate configuration involves designing the color filter to accept collimated white light illuminating it from an off-axis angle, instead of normal incidence, and placing a row of absorptive louvres between the color filter and the matrix display. In this configuration, only that light which is diffracted from the hologram layers will reach the target stripes. Louvers 24 preferably extend back from the edges of each successive set of cells to block the small amount of undiffracted zero-order light which would otherwise strike the wrong pixel elements and thereby reduce the display's contrast and color purity. However, the light diffracted by the hologram passes through the louvres to the targets.

A fiber optic face plate 25 may be laminated to the front of the matrix display cells 22. For any one of the three types of holographic lens arrays used, the fan of rays emanating from each matrix stripe is actually a rainbow of slightly different colored rays. Without the face plate, a viewer looking at one point on the display may observe a small but noticeable color change when moving across the exit pupil. Even if a ground glass screen or some other high-gain conventional screen were placed in front of the matrix display, the directionality of the rays would be preserved enough to cause a noticeable color shift across the exit pupil. If the cylindrical holographic lens array is used, then the rays exiting each pixel element exit in a planar fan of rays which are not conducive to proper viewing. However, when light enters and passes through each individual optical fiber in the fiber optic face plate, each ray undergoes a very large number of internal reflections off the core/cladding interface which has the effect of rotating the orientation of each ray. The orientation of the various exit rays is such a complex and sensitive function of input ray orientation that it is in effect nearly random. A bundle of multi-colored rays of different orientations inserted into an optical fiber exit the other end as a color-blended, circularly symmetric cone of light. The surface of each fiber acts almost like a scattering point in a diffusion screen. Therefore, the face plate not only color-mixes the input light, but also creates a screen surface.

The face plate 25 is designed to have its fibers oriented such that their axes are parallel to the central rays of the incident fan of light. The solid angle of the diffuse exit cone is determined by the f stop of the hologram system - the smaller the f stop, the larger the cone solid angle. An added advantage is that a fiber optic face plate is highly immune to backscatter of ambient light. The net result of the triple layer holographic lens and fiber optic face plate is a full color high brightness display with high color purity and display contrast.

A full display system is shown in FIG. 5(b). Since the light cones exiting from the faceplate 25 are parallel to each other, it is usually desirable to place a focusing lens 26 on the front of the faceplate. This focuses the cones to a common exit pupil for the observer 27.

Figure 7:
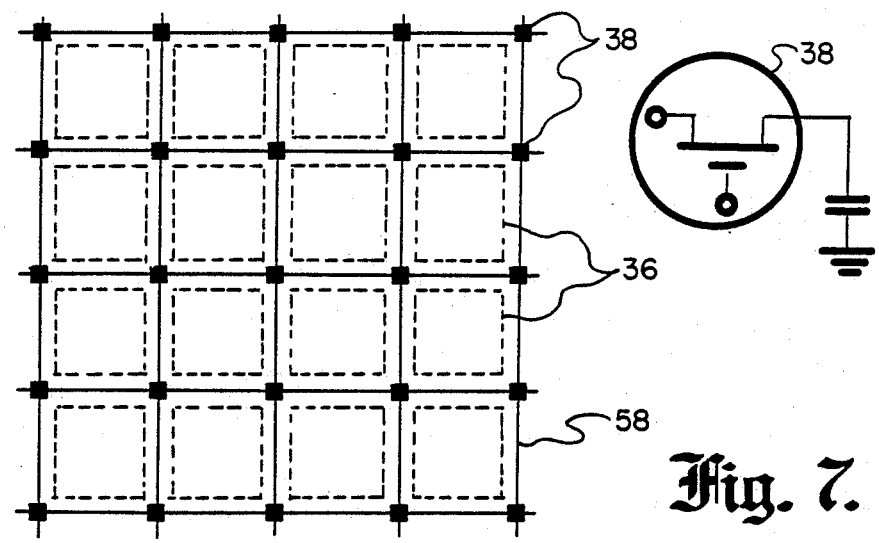
FIG. 7 is a plan view of the display control system employed in a flat panel display in which the present invention can be used.

A transparent pixel electrode array suitable for the type of flat-panel display in which the present invention can be used is illustrated in FIG. 7. The pixel electrodes 36, indicated in dashed line, comprise thin film silicon islands fabricated on a glass panel. The transistor switches, which as indicated are preferably FETs, are connected by means of metal wire conductors 58 to an appropriate electrical gating control (not shown). In a preferred embodiment the transparent pixels 36 are squares of 20 mils on each side, with a 2 mil spacing between the adjacent pixels to accommodate the transistor switches and wiring. Thus, the panel has a possible transmission efficiency of up to 81%.

Figure 8:
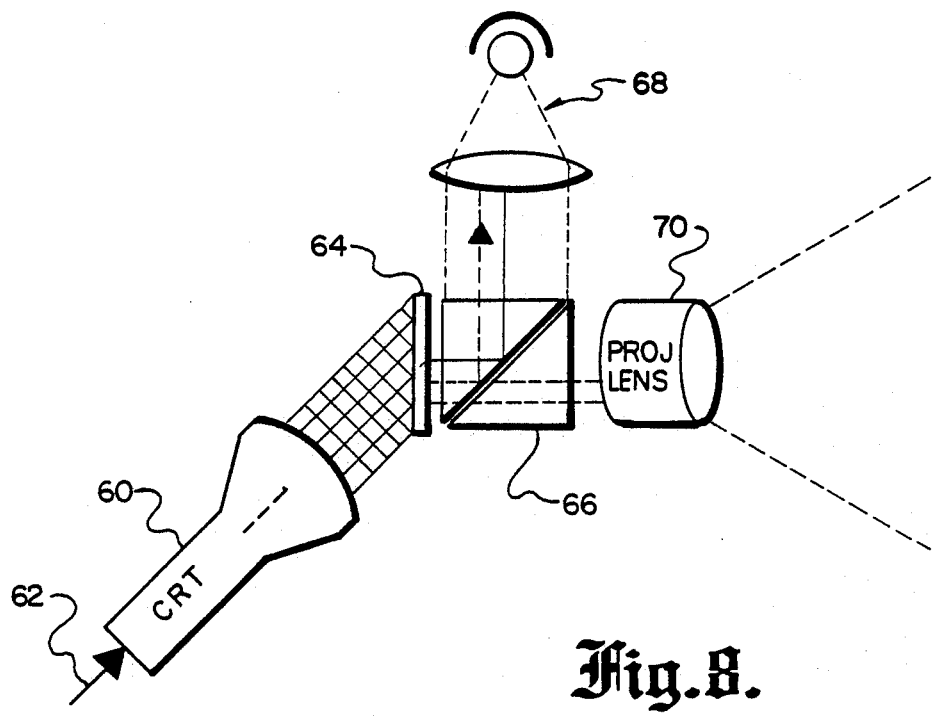
FIG. 8 is a block diagram of a liquid crystal light valve projection system in which the present invention can be used.

Another application of the invention is in a liquid crystal light valve (LCLV). Such an application is illustrated in FIG. 8, in which a fiber optic CRT 60 is shown receiving input data 62 and in response thereto providing a raster scanning output to LCLV 64. The LCLV output is processed through a polarizing beamsplitter 66 under the influence of a xenon lamp and condensor 68, such that desired portions of the LCLV output are directed onto a projector lens 70 for display. The use of an electron beam from a CRT to address an LCLv is discussed in an article by Duane Haven, "Electron-Beam Addressed Liquid-Crystal Light Valve", Proceedings of the International Display Research Conference, pages 72-74 (1982).

Figure 9:
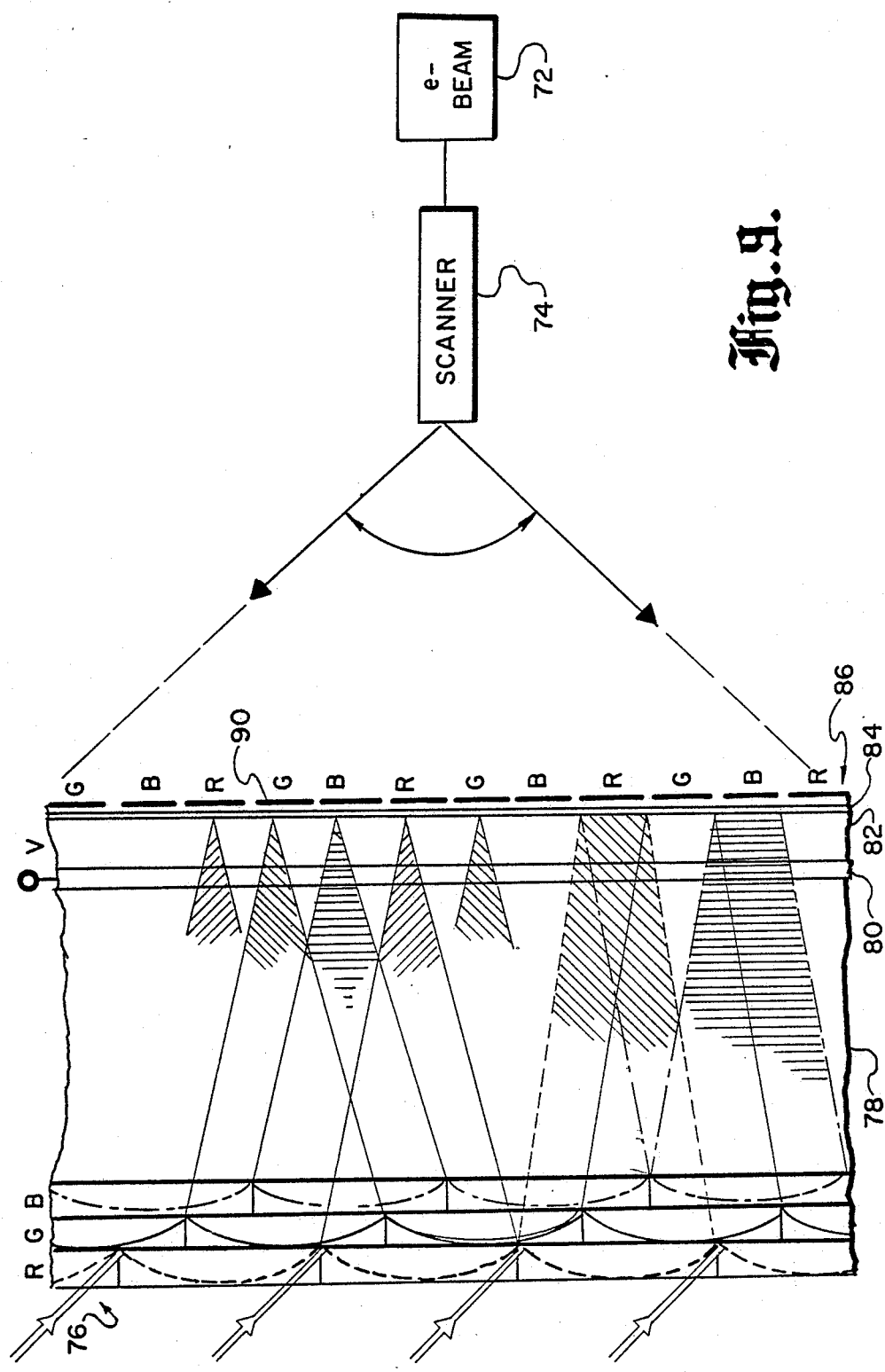
FIG. 9 is an enlarged illustrative sectional view of a liquid crystal light valve incorporating the present invention and controlled by an electron beam.

The application of the present invention to such a system is illustrated in FIG. 9. In this application, either the holographic cylindrical lens arrayor the holographic Fly's-eye lens array may be used. The CRT includes an e-beam generator 72 and a scanner 74 which deflects the e-beam is a raster beam. The LCLV consists of a three-color holographic lens assembly 76 as described previously, a transparent glass plate 78 which mounts the lens assembly on one side, a transparent conductive electrode 80 on the other side of the glass plate, a liquid crystal cell 82 adjacent the transparent electrode, and a broad band partially conducting dielectric or metal matrix mirror 84 on the other side of the liquid crystal cell. An array of pixel drive electrodes 86 are arranged immediately behind the mirror 84. The transparent electrode sheet 80 is maintained at a constant voltage V, which might be ground potential, to provide a reference for the pixel electrodes. Each pixel electrode is aligned with a corresponding color lens in the lens assembly 76; the electrodes are designated by color letters in FIG. 9 to indicate their corresponding red, green or blue lenses. The vertical dimension of each pixel electrode is approximately one-third that of its corresponding lens, while the pixel electrodes extend into the page for the same distance as the lenses.

In operation, the e-beam is scanned across the array of pixel electrodes and at the same time modulated in accordance with a desired signal pattern. Some of the pixel electrodes will be activated by the incident e-beam, as determined by its modulation pattern. The activated pixel electrodes will establish a voltage differential with respect to the reference transparent electrode sheet 80, causing the liquid crystal adjacent the pixel electrode to conduct polarized light from the lens assembly both towards and away from the mirror 84. The liquid crystal medium in the vicinity of the non-activated pixel electrodes will be oriented to prevent a two-way transit of polarized light from the lens assembly.

The operation of the LCLV for incoming polarized light that is restricted to the three primary colors, red, green and blue, is indicated in the upper portion of FIG. 9. For example, green light entering green holographic lens 88 will be diffracted onto the mirror 84 immediately in front of the green pixel electrode 90. If the pixel electrode has been activated by the e-beam, the light reflected off the mirror will be transmitted back through the liquid crystal medium 82 and collimated by lens 88 to produce a green output beam. Similarly, incoming blue and red light will be diffracted by the blue and red lenses onto their respective pixel electrodes and, if the electrodes have been activated, transmitted back through the liquid crystal medium to their respective lenses, which deliver collimated output light. By an appropriate modulation of the e-beam, any particular electrode can be fully activated, fully de-activated or partially activated, and the output light from that electrode will reflect its degree of activation. In addition to producing a highly efficient operation, the LCLV also superimposes each color on top of the other, rather than separating the colors as in the conventional color stripe approach. This produces a significant improvement in the system's resolution.

The lower portion of FIG. 9 illustrates the situation when the incoming light covers a broad spectrum. The operation of only the red and blue pixels electrodes have been shown, with the operation of the green pixel electrode omitted to avoid cluttering the figure. Since the incoming light occupies substantially the full waveband associated with each primary color, rather than being restricted to the center wavelengths, the lenses 76 will only partially focus the wavelengths towards the edges of each waveband. With a proper selection of lenses and system dimensions, this results in a spreading of the diffracted light within each waveband over substantially the full area of the corresponding pixel electrode. Again, the light which is incident upon the mirror immediately in front of an activated pixel electrode will be reflected and transmitted back through the liquid crystal cell, and travel back to the lens for collimation into an output light beam.

Another form of LCLV, in which the device is responsive to a control light beam rather than to an e-beam, is illustrated in FIG. 10. This type of light valve is described, for example, in U.S. Pat. No. 3,824,002 to Terry Beard, assigned to Hughes Aircraft Company. The device comprises a holographic lens assembly 92 as previously described (which may either be a holographic cylindrical lens array or a holographic Fly's-eye lens array) mounted on one side of a transparent glass plate 94, a transparent conductive electrode sheet 96 on the other side of the glass plate, a liquid crystal light modulating cell 98 contained in a quartz film 100 next to the electrode sheet, a broad band dielectric or metal matrix mirror 102 next to the liquid cell, a light blocking layer 104 next to the mirror, and a photoconductor layer 106 next to the light blocking layer with a transparent pixel electrode array 108 deposited on an outer glass substrate 110. A voltage source 112 establishes a potential difference between the electrode array 108 and the electrode sheet 96. Alternatively, electrode array 108 could be provided as a continuous electrode sheet which is functionally divided into pixel areas.

The spatial intensity pattern of an incoming control light beam 114 controls the spatial reflective properties of the valve. In the absence of control light, the voltage between pixel electrodes 108 and electrode sheet 96 is established primarily across photoconductor layer 106, which acts as an insulator in the absence of light. When control light is applied to a particular pixel electrode, it is transmitted through the transparent electrode to the immediately adjacent portion of the photoconductor layer, rendering that portion of the layer conductive. The voltage drop between the pixel electrode and the electrode sheet is thus transferred primarily onto the portion of the liquid crystal cell 98 which is aligned with the activated pixel electrode. This enables that portion of the liquid crystal medium to transmit polarized projection light 116 in both directions, while the transmission of reflected light from mirror 102 is blocked at locations aligned with non-activated pixel electrodes. Thus, the pixel electrodes 108 may be viewed as projecting pixels onto mirror 102, with the transmission of reflected light from the mirror pixel locations depending upon the activation or non-activation of the corresponding pixel electrodes 108. This projection of effective pixel areas is indicated in FIG. 10 by projection lines 118.

The light-controlled LCLV of FIG. 10 exhibits a high efficiency and resolution similar to that of the e-beam-controlled LCLV of FIG. 9. While the LCLV of FIG. 10 is illustrated as a reflective device, it could also be implemented as a transmissive device by eliminating the mirror 102 and the light blocking layer 104.

The construction of the holographic lens assembly itself will now be discussed in conjunction with FIGS. 11a and 11b. The simplest design, illustrated in FIG. 11a, would result if all three holograms could be exposed in a single gelatin film layer 120 on a transparent substrate 122, with a transparent cover plate 124 protecting the other side of the film layer. However, a single gelatin layer may not possess sufficient dynamic range in index modulation to support three efficient transmission holograms. This can be resolved by designing the lens assembly so that the three holograms do not all lie in the same plane. For example, three separate hologram films 125, one for each color band, could be formed on three separate transparent substrates 126, and the resulting holograms plates stacked together as indicated in FIG. 11b. If two holograms can be supported in a single film layer, it is possible to form an essentially single plane lens assembly for all three lenses. This is accomplished by forming a single color film on one substrate 128, a double color film on a second substrate 130, and then laminating the two hologram plates together with the two hologram films on the inside.

The process for fabricating the holographic diffusion lens array will now be described. The methods for fabricating the holographic cylindrical lens array and for fabricating the holographic Fly's-eye lens array are quite similar. The fabrication of only one hologram, for example the green hologram, will first be described. The techniques for fabricating all three holograms with proper registration will then be discussed.

A one-step process for exposing a set of cylindrical holographic lenses for the on-axis holograms is illustrated in FIG. 12. It uses a standard technique for forming holograms, which is repeated for each color. For the first color (red, green or blue), a laser 128 which produces a beam of that color is directed towards a beam expander 130. The expanded beam is collimated by a collimating lens 132 and directed onto a glass or clear plastic plate 134. The opposite side of plate 134 has a series of adjacent half-cylinder lenses 136 which focus the incident beam to a series of crossover lines 138. The holographic lenses are formed in a gelatin film 140, which is carried on a transparent plate 142 on the opposite side of the beam crossovers from lenses 136. The plate 142 is positioned such that the successive lenses 136 are imaged onto the gelatin film 140 in adjacent image stripes 144. A reference beam 146 from the same laser 128 is directed onto gelatin film 140 by means of a beam splitter 141 along a separate path (not shown). In the normal manner of forming holograms, the periodic images of the "object" beam from lenses 136 and the reference beam 146 produce an interference pattern in the gelatin.

When the first color has been holographically imaged onto the gelatin film, a different laser corresponding to the second color is substituted for laser 128. Either plate 134 or plate 142 is shifted vertically with respect to the other, so that holographic image stripes of the second color are formed on the gelatin, shifted vertically by one-third the width of the first color image stripes. A laser producing a beam of the third color is then substituted for the second laser, and plate 134 or 142 again shifted vertically to offset the third color stripes from the second color stripes by one-third the stripe widths. Gelatin 140 is then developed and dried to produce a three-color holographic lens with partially overlapping lens stripes as described above.

Figure 14:
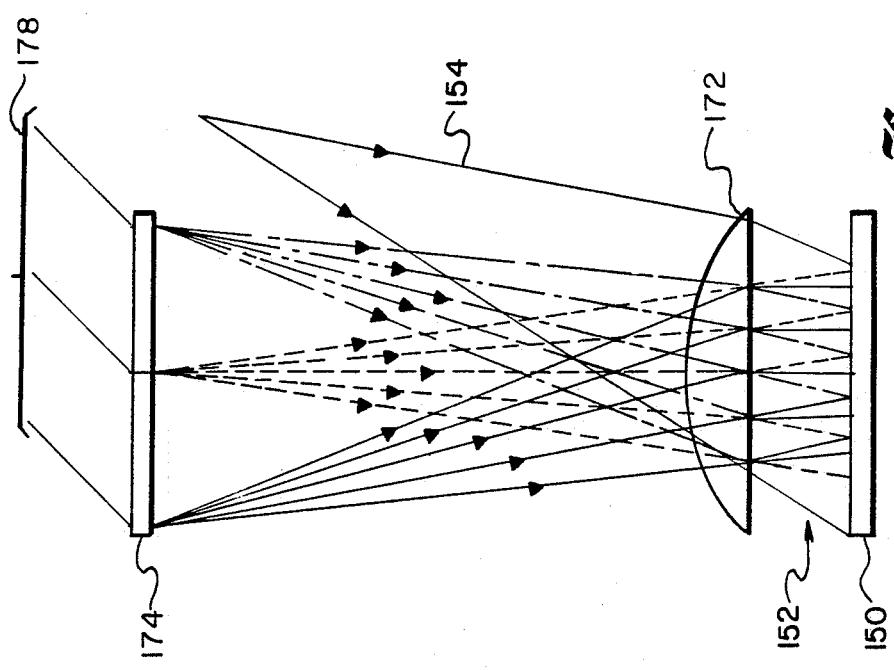
FIG. 14 is a block diagram showing the final exposure set-up for the hologram lens.
Figure 13:
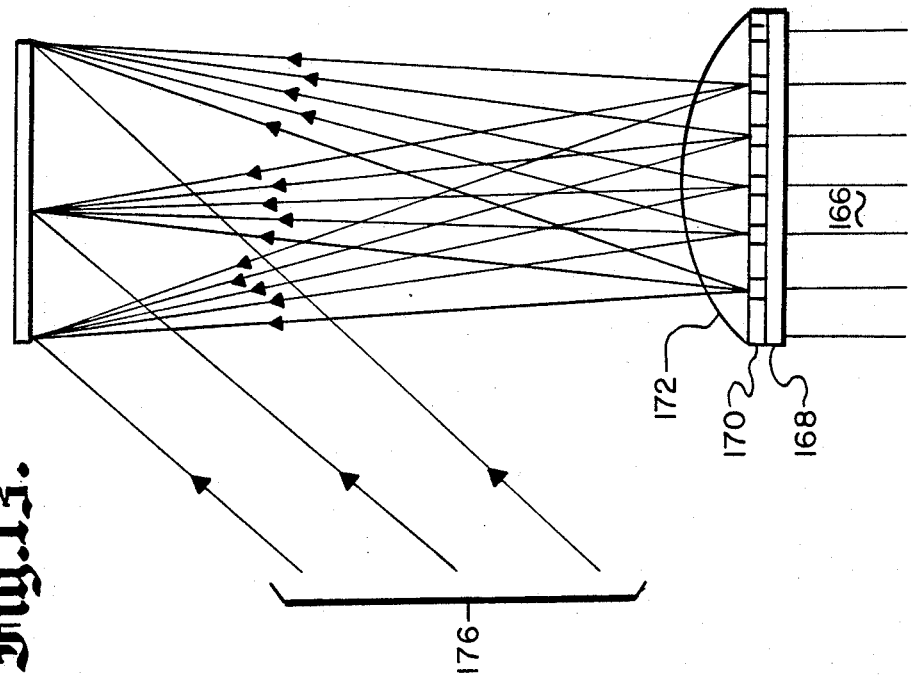
FIG. 13 is a block diagram illustrating the exposure of one of the hologram lenses used in the invention.

An alternate method of fabricating the holographic lens is illustrated in FIGS. 13 and 14. The first step of the alternate method of fabricating the green hologram is to generate a striped mask pattern. The striped pattern is preferably specified in computer code, automatically drawn onto a Gerber plotter, and photo-reduced to a reticle having a striped mask pattern. The stripes consist of a repeated pattern of blackened stripes separated by transparent stripes. Consistent with the previously described applications for the invention, each pattern would be 30 mils wide. Since chromatic dispersion creates a fan of rays diffracting from each hologram, the transparent stripes should be somewhat less than 10 mils wide, but not so narrow such that too little light can pass through the reticle.

FIG. 13 illustrates the set-up for the second step in the fabrication - the exposure of an intermediate hologram. A collimated beam of laser light 166, which may have a 514.5 nm wavelength for an argon laser, is diffused by a ground glass screen 168, passes through the striped mask reticle 170, and is focused by a plano-convex spherical lens 172 onto a silver halide film plate 174. The focal length of lens 172 and the diameter of film plate 174 are chosen to create the desired f stop in the eventual finished hologram. At the film plane, interference between the focused image beam (called the object beam) and a collimated reference beam 176 creates a holographic recording in the film.

The final hologram exposure set-up is shown in FIG. 14. In this set-up the partially exposed silver halide hologram 174 has the same relationship with respect to the plano-convex lens 172 as it did in the initial set-up of FIG. 13. A collimated reference beam 178 of exactly reverse direction to the collimated beam 176 of FIG. 13 is directed onto the silver halide hologram, and is diffracted by the hologram towards the plano-convex lens 172 where the image of the reticle is focused at the back planar surface of the lens. A verification of this focus can be obtained by placing the striped reticle 170 on the planar surface of lens 172 and adjusting its orientation until the reticle image passes completely through. Then, by translating the reticle 10 mils sideways, the image light transmitted through it should be almost eliminated. In this manner the correct focus and spacing of the reticle image can be verified.

An alternate verification technique is to expose the reticle image onto a silver halide film plate 150 placed below the planar lens surface, and measure precisely the dimensions of the recorded image by observing the developed silver halide plate under a microscope. Between the planar surface of lens 172 and the dichromated gelatin film plane is a gap 152, which is precisely large enough to cause the fan of rays emanating from adjacent stripes in the focused reticle image to just touch each other at the film plane.

Diffraction fringes on the hologram should be negligible, since the aperture dimension of 10 mils is much larger than the laser wavelength, 514.5 nm. A spherical reference wave 154 is collimated by the plano-convex lens 172 and interferes with the diffuse object beam at the film plane 150 to create a hologram recording. The diffraction angle properties and diffraction efficiency vs. wavelength properties of the hologram are determined by the geometry and wavelength of the exposure beam, by the exposure energy level, and by the film layer thickness. These parameters may be adjusted to achieve the desired hologram properties.

With the green hologram exposed using the 514.5 nm line of an argon laser, the blue hologram can be exposed in a similar manner using the blue 488 nm argon laser line. While the argon laser output at 488 nm is less intense than at 514.5 nm, the dichromated gelatin film 150 is more sensitive to 488 nm light than to 514.5 nm light; the two effects basically cancel each other. Accordingly, the green and blue exposures can be done using the same argon laser by tuning the laser between exposures. For the blue exposure, a separate intermediate silver handle screen needs to be recorded. Since verification that the spacing of the striped reticle image is precisely correct is a delicate and time-consuming task, it may be preferred to have separate exposure set-ups for the green and blue exposures. In this way, once the proper alignment of the hologram image is accomplished, the set-up can remain fixed and immobile without the need to replace components. Preferably, the blue and green exposures are performed in the same dichromated gelatin layer. If the blue and green holograms are exposed on the same film plate, it is important that the blue exposure be shifted precisely 10 mils with respect to the green exposure.

Exposure of the red hologram should be done in a different manner. One reason is that the dichromated gelatin (DCG) film is not sensitive to red light. While a dye sensitized DCG film does achieve red sensitivity, its difficulty in usage and short shelf life discourage its employment. Silver halide holographic film which is sensitive to red light is available, but its gelatin layer may be too thin to support a highly efficient red transmission hologram. Furthermore, the argon laser does not have any appreciable red output, so another laser such as helium-neon with a 632.8 nm output would be needed.

One means of exposing the red hologram is with a red-sensitive photopolymer film produced by Polaroid Corporation under the designation DMP-128. While this film does not offer as much dynamic range as DCG, it permits fabrication of a sufficiently high-efficiency red transmission hologram. For the red hologram exposure, a separate red silver halide intermediate hologram should be fabricated, as with the blue and green hologram set-ups.

An alternative approach to the red hologram fabrication described above enables the hologram to be exposed in DCG film in 514.5 nm argon laser light. Decreasing the angle between the object and reference beams of FIG. 14 will increase the fringe spacing in the film, which in turn increases the wavelength at which it will diffract with maximum efficiency. Accordingly, with a proper design the red hologram can be exposed in a pre-distorted set-up using 514.5 nm argon light. A separate silver halide intermediate hologram needs to be generated and the reticle image should be aligned carefully, as with the blue and green exposure set-ups. Because there is a large difference between the exposure wavelength and the wavelength of maximum playback efficiency, the f stop of the final hologram playback system should be as large as possible to minimize distortion problems.

The final step is to laminate the red hologram to the blue/green hologram or, if necessary, to laminate three separate red, green and blue holograms together. In either case proper registration of the three images must be obtained. This can be accomplished with a laminating fixture in which the hologram plates are precisely positioned against alignment pins during lamination, and precide 10 mil shifts are created between the plates. The gluelines should be very thin and controllable to achieve proper registration.

The fabrication of the red, green and blue holograms may be summarized as follows:

(1) Fabrication of striped reticle and full color playback reticle.

(2) Fabrication of three intermediate silver halide holograms.

(3) Assembly and precise alignment of three separate final exposure systems.

(4) Exposure of red, green and blue final holograms.

(5) Lamination of holograms with precise registration.

It is an advantage of the invention that the exposure technique can be readily adapted to large scale production. Step (4) above will generate red, green and blue hologram masters which may then be used to generate replicas quickly by contact printing.

While various embodiments of the invention have been shown ad described, it should be understood that numerous variations and alternate embodiments will occur to those skilled in the art. Accordingly, it is intended that the invention be limited only in terms of the appended claims.

We claim:

1. A high efficiency color display device for displaying selected elements of an input electromagnetic radiation beam having a plurality of different waveband components, comprising:
    an area target array comprising a plurality of generally adjacent target areas respectively corresponding to predetermined waveband components of the input radiation beam, and
    an area lens assembly spaced from the target array and adapted to receive an input radiation beam, the lens assembly having, for each target area in the target array, a lens means which is optically aligned with said target area, each lens means being adapted to converge converging input radiation within the waveband of its corresponding target area onto said area and to generally transmit input radiation outside said waveband, each said lens means and corresponding target area being adapted to direct said converging input radiation after convergence with angular divergence for superimposed display, the lens means for the various wavebands being arranged in the lens assembly so that at least one lens means for each of the waveband components is disposed in the path of input radiation substantially across the area of the lens assembly, each lens means partially overlapping a lens means or each of the other waveband components.

2. The color display device of claim 1, wherein the radiation beam has n waveband components, the area of each target area is approximately A, and the area of each lens means is approximately nA.

3. The color display device of claim 2, wherein the waveband components are centered on red, green and blue optical radiation.

4. The color display device of claim 1, said lens means comprising holographic lenses.

5. The color display device of claim 1, wherein the lens means for each waveband has a peak to radiation near the center of the waveband and a generally progressively diminishing response to radiation further away from the center of the waveband, whereby input radiation is distributed over each target area in accordance with its wavelength relative to the center of its waveband.

6. The color display device of claim 1, said area target array comprising an array of transmissive light modulation cells and a fiber optic faceplate located on the opposite side of the cells from the lens assembly to blend light transmitted by the cells.

7. The color display device of claim 6, said area target array further comprising a focusing lens positioned over the fiber optic faceplate to receive and focus light emitted from the faceplate.

8. The color display device of claim 1, further comprising a plurality of spaced louvers extending form the area target array toward the lens assembly to block leakage light passed through the lens assembly from reaching undesired locations on the target array.

9. A lens structure for spatially separating white light into component radiation wavebands centered on a plurality of discrete wavelengths, comprising:
    a plurality of area holographic lenses, each lens being responsive to a radiation waveband centered about a respective one of said discrete wavelengths, and
    an optically transmissive substrate means, the holographic lens for each waveband being disposed on the substrate means and offset in staggered order from the lenses for the other wavebands such that the total of the incremental offsets for the successive lenses in a full set of the discrete wavelengths approximately equals the dimension of each lens in the offset direction.

10. A lens structure for spatially separating white light into component radiation wavebands centered on red, green and blue wavelengths, comprising:
    first, second and third holographic lens arrays, each lens array comprising a plurality of lateral holographic lenses, the three lens arrays being responsive to radiation wavebands centered respectively on red, green and blue,
    the lenses of each array being offset in staggered order from the lenses of each of the other arrays by approximately one-third the lens dimensions along the offset, and
    transparent substrate means mounting aid lenses.

11. The lens structure of claim 10, wherein the green lenses are responsive to a radiation bandwidth which overlaps the bandwidths of other lenses.

12. The lens structure of claim 10, wherein the red, green and blue lenses are formed on a common substrate.

13. The lens structure of claim 10, wherein the red, green and blue lens arrays are each formed on respective individual substrates, and said substrate/lens assemblies are laminated together.

14. The lens structure of claim 10, wherein the red lens array is formed on one substrate and the blue and green lens arrays are formed on a second substrate, and said substrate/lens assemblies are laminated together.

15. A color display light valve for an input light beam composed of a plurality of wavebands, comprising:
   an array of pixels,
   means for applying electrical control signals to desired patterns of said pixels,
   an area lens assembly spaced from the pixel array and adapted to receive an input light beam, the lens assembly having, for each pixel, a lens means which is optically aligned with said pixel, each lens means being adapted to at least partially focus input light within a respective waveband onto an area controlled by its corresponding pixel and to generally transmit input light outside said waveband, the lens means for the various wavebands being arranged in the lens assembly in staggered order so that at least one lens means for each of the waveband components is provided at substantially all locations across the path of an input light beam, and
   a light modulating medium between the pixel array and the lens assembly which is responsive to the spatial pattern of control signals applied to the pixels to control the transmission of input light within said wavebands,
   whereby an output form said input light beam is provided which excluded form the input beam substantially only the light excluded in responsive to the control signals applied to the pixels.

16. The color display light valve of claim 15, wherein the lens means for each waveband has a peak response to radiation further away form the center of the waveband, whereby input radiation is distributed over each pixel in accordance with its wavelength relative to the center of its waveband.

17. The color display light valve of claim 15, the number of wavebands being n, wherein the area of each lens means is approximately n times the area of its corresponding pixel, and each lens means overlaps adjacent lens means so that the area of the lens assembly is approximately equal to the are of the pixel array.

18. The color display light valve of claim 17, wherein said lens means comprise holographic lenses.

19. The color display light valve of claim 18, implemented as a liquid crystal light valve, wherein the light modulating medium comprises a liquid crystal medium, and the means for applying electrical control signals to desired patterns of pixels comprises an array of transparent electrodes whose geometry is substantially similar to the pixel array, a photoconductor layer having a spatial electrical conductivity which varies with the intensity of incident light on the photoconductor layer, the photoconductor layer electrically coupling the electrode array with the pixel array, and means for establishing a voltage potential across the electrode array and the liquid crystal medium, whereby the spatial light modulation of the liquid crystal medium varies in accordance with the pattern of incident light on the photoconductor layer.

20. The liquid crystal light valve of claim 19, implemented as a reflective device wherein a light blocking layer is disposed on the liquid crystal side of the photoconductive layer, and a mirror layer is disposed between the light blocking layer and liquid crystal medium facing the liquid crystal, the pixels comprising pixel areas on the mirror layer corresponding to the transparent electrodes.

21. The liquid crystal light valve of claim 19, implemented as a transmissive device wherein the photoconductor layer is coupled substantially directly with the liquid crystal medium.

22. The color display light valve of claim 19, wherein the light modulating medium comprises a liquid crystal medium, and the means for applying electrical control signals to desired patterns of pixels comprises an array of electrodes whose geometries are substantially similar to the pixel array, means for scanning an e-beam across the electrode array, and a mirror layer having the electrode array mounted on one side and a reflective surface facing the liquid crystal medium, the pixel array comprising pixel areas on the mirror layer's reflective surface.

23. A color display panel for displaying selected elements of an input light beam having a plurality of different waveband components, comprising:
   an optical display panel divided into an array of pixels corresponding to the various wavebands, and
   a holographic lens assembly spaced from the display panel and adapted to receive an input light beam, the lens assembly comprising, for each waveband, a plurality of generally adjacent holographic lenses adapted to at least partially focus light within the waveband onto respective pixels and to generally transmit light outside the waveband, the holographic lenses for the different wavebands being offset from each other and partially overlapping so that light transmitted through substantially all locations in the lens array encounters a lens for each of the different wavebands,
   whereby substantially all the light in an input light beam is displayed at the display panel in its constituent wavebands.

24. The color display panel of claim 23, wherein the input light beam has n waveband components, the area of each pixel is approximately A, the area of each lens is approximately na, and the area of overlap between each lens and the next adjacent lens is approximately (n-1)A.

25. The color display panel of claim 23, wherein the wavebands are centered on red, green and blue, respectively.

26. A method of displaying an input beam of electromagnetic radiation in its discrete component wavebands, the beam having a plurality of different waveband components, comprising:
   directing each spatial portion of the beam through a series of lenses in staggered order equal in number to the number of component wavebands, each lens being adapted to at least partially focus radiation outside its waveband, each lens overlapping at least one lens for each of the other wavebands.

27. The method of claim 26, wherein the input radiation has n waveband components, the area of each target area is approximately A, the area of each lines is approximately nA, and the area of and the are of overlap between each lens and the next adjacent lens (n-1)A.

28. The method of claim 26, wherein the lenses are holographic lenses.

29. The method of claim 28, where the waveband components are centered on red, green and blue optical radiation, respectively.

30. The method of claim 26, wherein the lenses are adapted to substantially focus radiation near the centers of their wavebands onto their respective target areas, and to apply diminishing degrees of focusing to radiation within the waveband which is further away from the center of the waveband.

* * * * *